(12) United States Patent
Keene et al.

(10) Patent No.: US 9,630,666 B1
(45) Date of Patent: Apr. 25, 2017

(54) MOBILE HUNTING AND LOOKOUT PLATFORM

(71) Applicants: David C. Keene, Hartley, IA (US); Brent C. Keene, Hartley, IA (US)

(72) Inventors: David C. Keene, Hartley, IA (US); Brent C. Keene, Hartley, IA (US)

( * ) Notice: Subject to any disclaimer, the term of this patent is extended or adjusted under 35 U.S.C. 154(b) by 0 days.

(21) Appl. No.: 14/989,852

(22) Filed: Jan. 7, 2016

(51) Int. Cl.
*A01M 31/02* (2006.01)
*B62D 63/06* (2006.01)

(52) U.S. Cl.
CPC ........... *B62D 63/061* (2013.01); *A01M 31/02* (2013.01)

(58) Field of Classification Search
CPC ......... B66F 11/04; E06C 5/04; B62D 63/061; A01M 31/02; A01M 31/025; E04G 1/24
USPC ............................................ 280/30; 182/63.1
See application file for complete search history.

(56) References Cited

U.S. PATENT DOCUMENTS

| | | | | |
|---|---|---|---|---|
| 261,874 A * | 8/1882 | Rich | .......................... | E06C 5/18 182/208 |
| 445,487 A * | 1/1891 | Arnold | ..................... | E06C 1/397 182/16 |
| 2,600,807 A * | 6/1952 | Rieser | ........................ | E06C 5/20 182/64.1 |
| 3,289,787 A * | 12/1966 | McSwain | .............. | E04H 15/001 182/20 |
| 3,406,784 A * | 10/1968 | Jones | ...................... | B66F 11/04 135/88.16 |
| 3,472,337 A * | 10/1969 | Atchey | ................. | B66F 11/044 182/141 |
| 3,740,075 A * | 6/1973 | Soehnlen | ............... | B62D 53/04 114/344 |
| 3,882,964 A * | 5/1975 | Schellenberg | .......... | B66F 11/04 182/127 |
| 4,427,093 A * | 1/1984 | Wehmeyer | ................ | E04G 1/22 182/141 |
| 4,442,919 A * | 4/1984 | Fulcher | ..................... | E04G 1/28 182/115 |
| 4,719,716 A * | 1/1988 | Chrisley, Jr. | .......... | E04H 1/1205 43/1 |
| 5,102,179 A * | 4/1992 | Royer | ................. | A01M 31/025 182/141 |
| 5,295,555 A * | 3/1994 | Strange | ..................... | E06C 5/04 182/116 |
| 5,564,523 A * | 10/1996 | Howard | ................ | A01M 31/02 182/152 |
| 5,862,827 A * | 1/1999 | Howze | ................ | A01M 31/025 135/140 |
| 6,347,684 B1 * | 2/2002 | Fath | ....................... | A01M 31/02 182/127 |
| 6,460,653 B1 * | 10/2002 | Hardy | ...................... | B60P 1/02 182/63.1 |
| 6,523,641 B2 * | 2/2003 | Smith | ................... | A01M 31/02 182/127 |

(Continued)

*Primary Examiner* — J. Allen Shriver, II
*Assistant Examiner* — Brian Cassidy
(74) *Attorney, Agent, or Firm* — McKee, Voorhees & Sease, PLC (57) ABSTRACT

A portable lookout platform is provided with legs which can be moved between raised and lowered positions via a cable and winch system. Pulleys and rollers provide for controlled movement of the legs. A platform is mounted on top of the legs to support a person. The ladder provides access for a person to the platform when the legs are raised. The legs, platform and ladder are mounted on a trailer for transportation.

20 Claims, 6 Drawing Sheets

(56) References Cited

U.S. PATENT DOCUMENTS

| | | | |
|---|---|---|---|
| 6,637,549 B1* | 10/2003 | Lopacki | A01M 31/02 182/115 |
| 6,640,928 B1* | 11/2003 | Ridley, Jr. | E04F 11/06 182/208 |
| 6,978,862 B1* | 12/2005 | Cotten, Sr. | A01M 31/025 182/127 |
| D519,647 S * | 4/2006 | Watson | D25/62 |
| 7,055,878 B2* | 6/2006 | Imhof | B60P 3/32 296/26.07 |
| 7,104,360 B2* | 9/2006 | Atkins | E06C 5/04 182/127 |
| 7,188,635 B2* | 3/2007 | Johnson | A01M 31/02 135/87 |
| 7,513,333 B2* | 4/2009 | Davis | E06C 5/02 182/115 |
| 7,823,901 B2* | 11/2010 | Waddell | B62D 63/061 280/401 |
| 8,151,934 B2* | 4/2012 | Kirby | A01M 31/02 182/127 |
| 8,251,177 B2* | 8/2012 | Watt | B66F 11/04 182/141 |
| 8,708,104 B1* | 4/2014 | Sponsler | A01M 31/02 182/133 |
| 8,777,254 B1* | 7/2014 | Fowler | A01M 31/02 280/656 |
| 2002/0134620 A1* | 9/2002 | Meyer | A01M 31/02 182/127 |
| 2003/0000769 A1* | 1/2003 | Pyle | E06C 1/39 182/63.1 |
| 2003/0051942 A1* | 3/2003 | Atkins | A01M 31/02 182/63.1 |
| 2004/0083660 A1* | 5/2004 | Atkins | E06C 5/04 52/64 |
| 2007/0045046 A1* | 3/2007 | Hayes | A01M 31/02 182/63.1 |
| 2008/0302602 A1* | 12/2008 | Schultz | A01M 31/02 182/69.4 |
| 2009/0236179 A1* | 9/2009 | Lopez | A01M 31/02 182/63.1 |
| 2012/0211304 A1* | 8/2012 | Rubey | A01M 31/02 182/63.1 |
| 2015/0252616 A1* | 9/2015 | Collyer | A01M 31/025 182/115 |

* cited by examiner

MOBILE HUNTING AND LOOKOUT PLATFORM

FIELD OF THE INVENTION

The present invention is directed towards a portable elevated platform or stand to support a box-type structure, such as a blind, to provide an elevated look-out for hunters, photographers, and others.

BACKGROUND OF THE INVENTION

Deer stands of many sorts are well known to provide a raised or elevated position for a hunter above the ground. These prior art hunting stands come in several variations, including permanent structures built on stilts or attached to a tree, and portable or mobile structures which can be moved to a desired location and then erected. Such portable structures may be self-supporting or may be attached to a tree. Prior art portable stands are often cumbersome or difficult to move between a lowered transport position and a raised use position. Some stands also require partial assembly after being moved to a desired site.

Accordingly, a primary objective of the present invention is the provision of a portable, elevated platform for various uses which can be quickly and easily moved to and from transport and use positions.

Another objective of the present invention is the provision of a mobile platform which is simple to move between a lowered transport position and a raised use position.

A further objective of the present invention is the provision of a portable, elevated platform which will support a hunting blind or other enclosure for housing one or more people.

A further objective of the present invention is the provision of a look-out stand having support legs which easily move between horizontal and vertical positions.

Still another objective of the present invention is the provision of a portable look-out platform having a simple winch system for converting the platform between storage and use positions.

Another objective of the present invention is the provision of a portable look-out platform which is economical to manufacture, and safe and durable in use.

These and other objectives will become apparent from the following description of the invention.

SUMMARY OF THE INVENTION

A portable look-out platform assembly is movable between a lowered position for transport and storage, and a raised position for use by one or more people, such as hunters and photographers. The platform assembly includes a trailer for towing. The look-out stand assembly includes a pair of front legs and a pair of back legs. The front and back pairs of legs are interconnected. The legs have lower ends pivotally attached to the trailer frame and upper ends which support a platform. A winch is mounted to the frame. A first cable system extends between the winch and the frame. A second cable system extends between the front and back legs. A connector interconnects the first and second cable systems, whereby actuation of the winch moves the legs between raised and lowered positions via the cable systems. A ladder provides access to the raised platform.

DETAILED DESCRIPTION OF THE PREFERRED EMBODIMENTS

The portable look-out platform assembly of the present invention is generally designated by the reference numeral 10 in the drawings. The assembly 10 includes a trailer 12 with an axle and wheels 14 for transportation. Four jacks 16 are provided on the trailer 12 to stabilize the assembly 10 in a use position. The jacks 16 can be rotated 180° to an inverted position, and fixed by a pin 18 for transport of the platform assembly 10.

Figure 1:
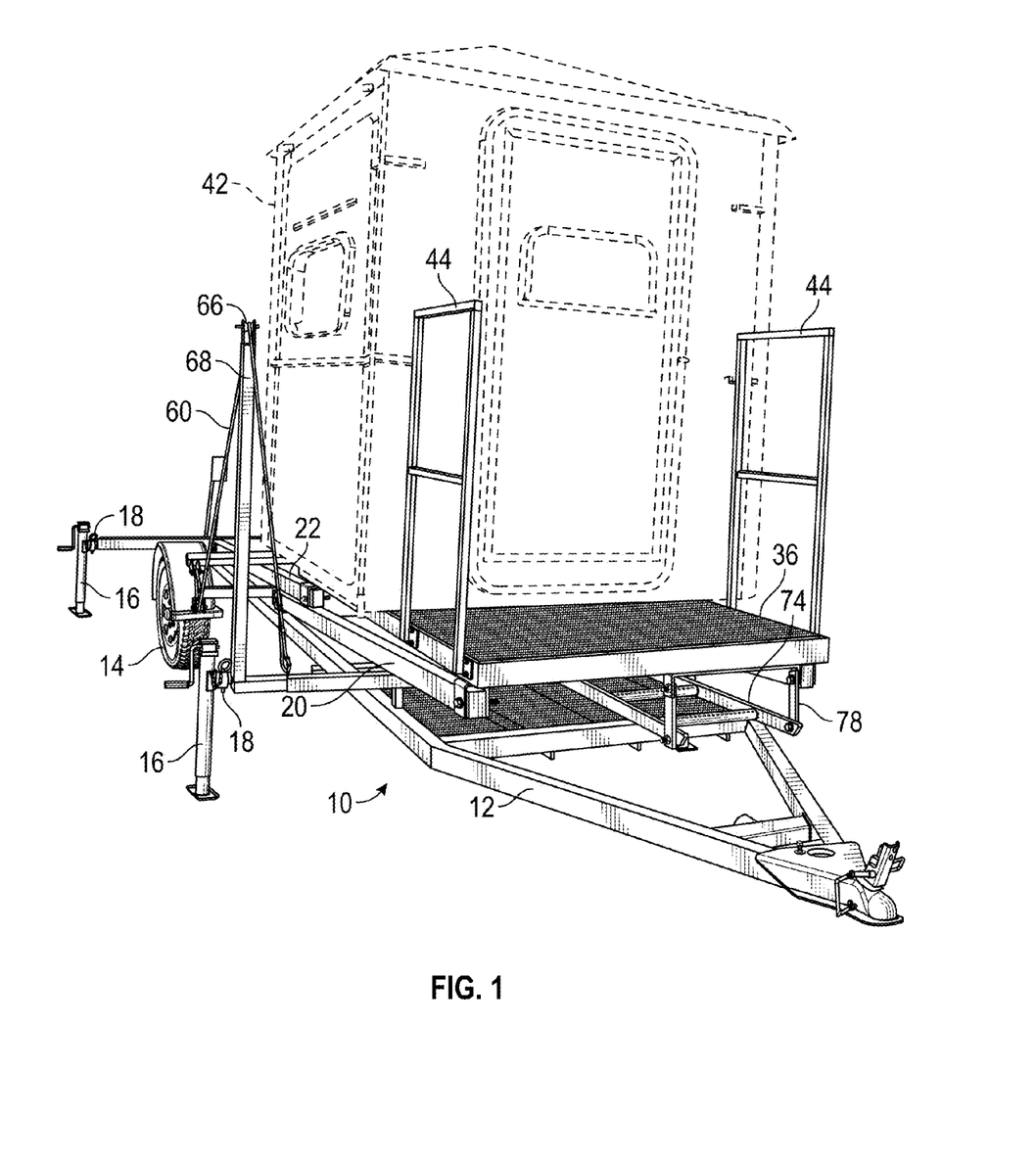
FIG. 1 is a perspective view of the portable look-out platform assembly of the present invention in a lowered, transport position, with a housing structure or blind mounted thereon, as shown in broken lines.
Figure 2:
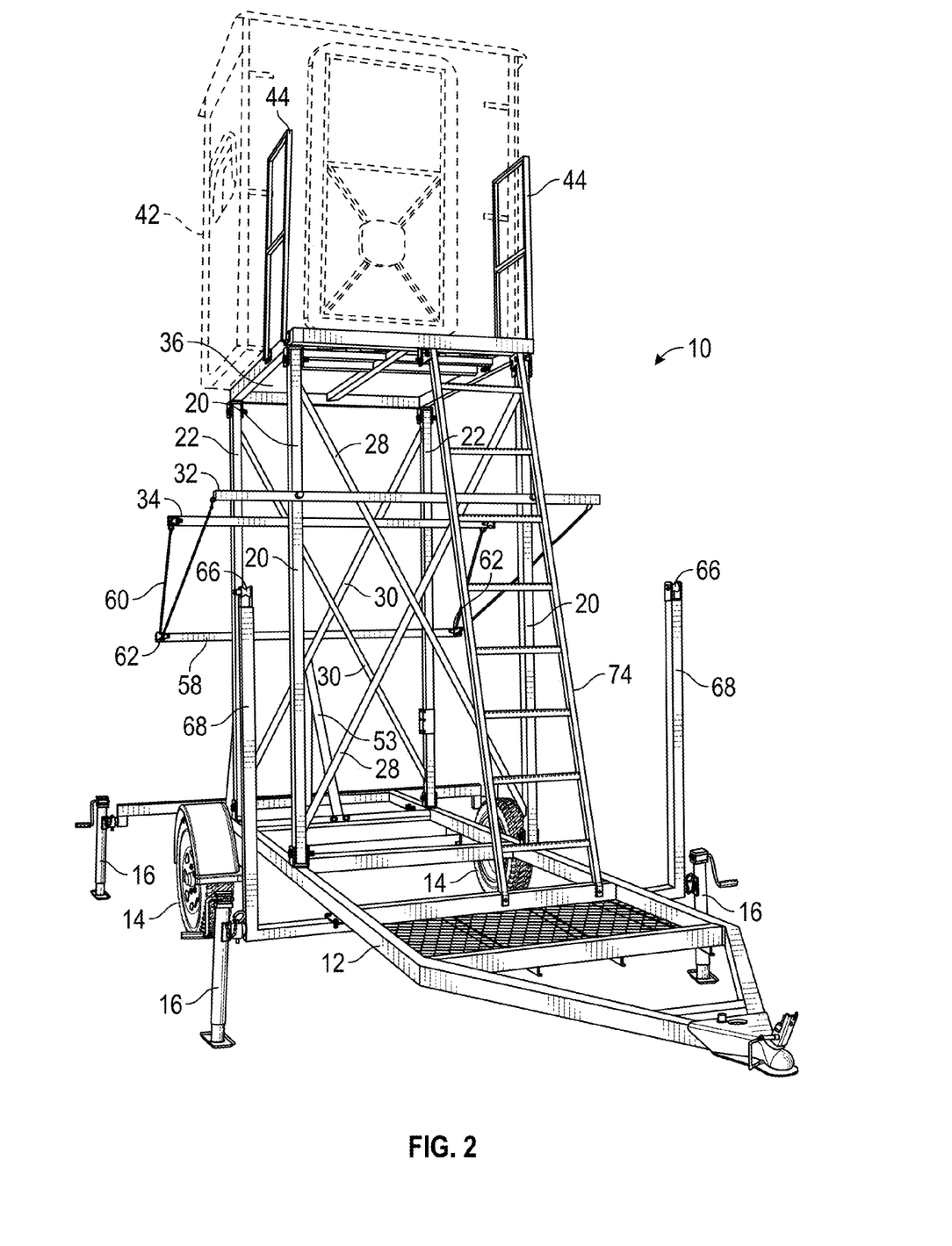
FIG. 2 is a perspective view showing the platform assembly of the present invention in a raised, use position.
Figure 3:
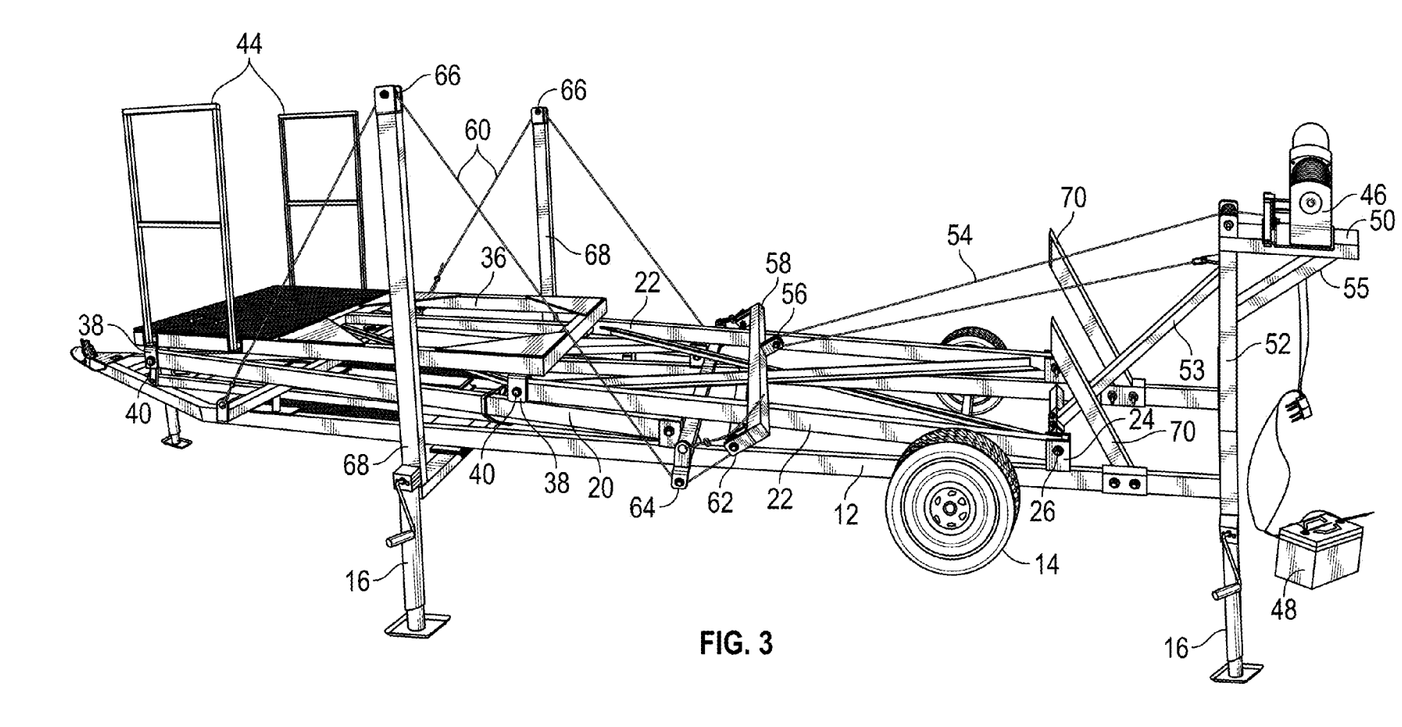
FIG. 3 is another view of the platform assembly in the lowered position.
Figure 4:
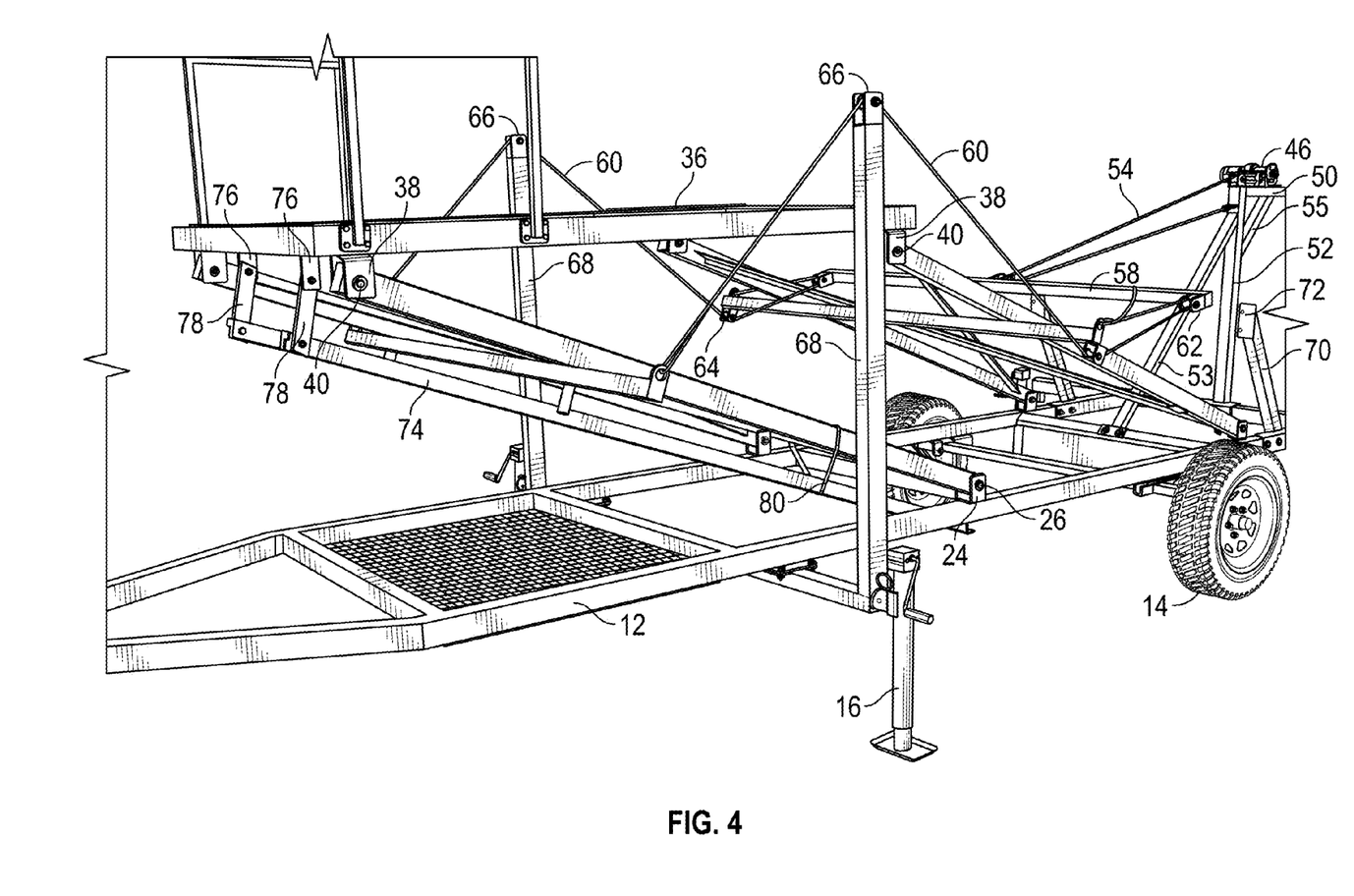
FIG. 4 is a view of the platform assembly in a partially raised position.

The platform assembly 10 includes a pair of front legs 20 and a pair of rear legs 22. Each of the legs 20, 22 has a lower end which is pivotally attached to the trailer 12 in any convenient manner. For example, as best seen in FIGS. 3 and 4, a U-shaped yoke 24 can be welded or otherwise fixed to the trailer frame 12, with a pin or bolt 26 extending through the yoke and the lower ends of the legs 20, 22. Thus, the legs 20, 22 are pivotal between a substantially horizontal, lowered transport and storage position and a substantially vertical, raised use position. Cross braces 28 extend between the front legs 20 for stability. Similarly, cross braces 30 extend between the rear legs 22 for stability. A cross bar 32 is fixed to the front legs 20, and a cross bar 34 is fixed to the rear legs 22. The cross bars 32, 34 extend laterally outwardly beyond the legs 20, 22, respectively.

A platform 36 is pivotally mounted to the upper ends of the legs 20, 22. As seen in FIGS. 3 and 4, a yoke 38 extends downwardly from the platform 36 at each corner, with a bolt 40 extending through the yoke and through the upper ends of the legs 20, 22. The platform 36 is adapted to support a blind or other housing structure 42 in which a person can stand or sit. The blind or housing structure 42 can have various configurations, and is fixed to the platform 36 in any convenient manner. Rails 44 may be provided on the platform 36, as a safety feature.

The legs 20, 22 are moved between the lowered and raised positions using a cable system. More particularly, the cable system includes a winch 46 which may be connected to a power source, such as a battery 48. Alternatively, the winch 46 can be hand cranked. The winch 46 is mounted on a shelf 50 supported by a post 52, with braces 53, 55, at the rearward end of the trailer frame 12.

Figure 6:
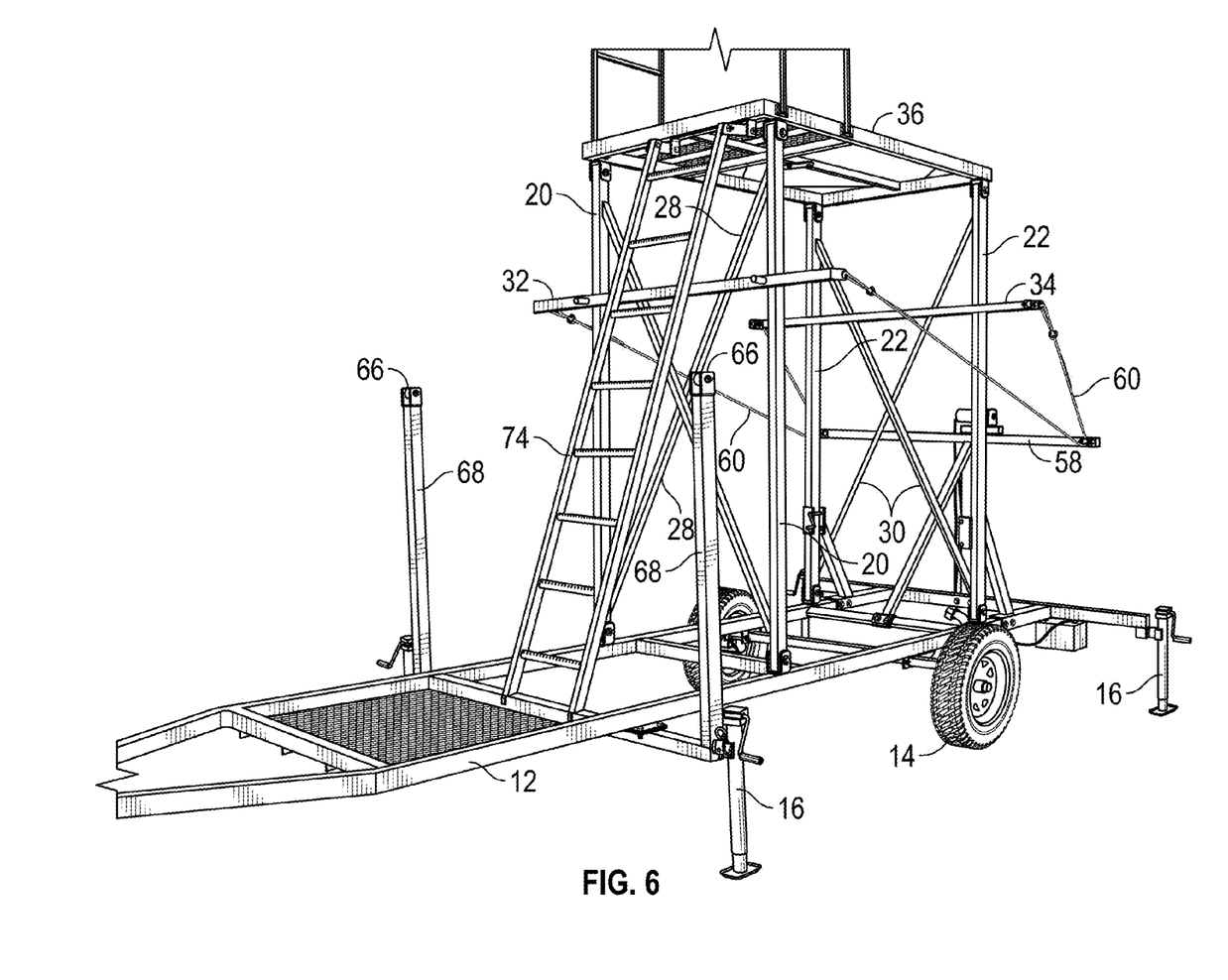
FIG. 6 is a perspective view showing the platform assembly in a raised position.

A first cable 54 has one end attached to the winch 46 and another end attached to the post 52, as best seen in FIG. 3. The cable 54 extends around a pulley 56 attached to the center of a cross bar 58. The cross bar 58 is not attached to the legs 20, 22 or to the trailer frame 12. Second and third side cables 60 each have opposite ends attached to the cross bars 32, 34 as best seen in FIGS. 3 and 6. The cables 60 each extend around a pulley 62 at opposite ends of the cross bar 58. When the legs are in the lowered position (FIG. 3), the cables 60 also extend under a roller 64 at each end of the cross bar 34 and over a roller 66 on the upper ends of posts 68 fixed and extending upwardly from the trailer frame 12. The cross bar 58 operatively functions as a connector between the cables 54 and 60.

Figure 5:
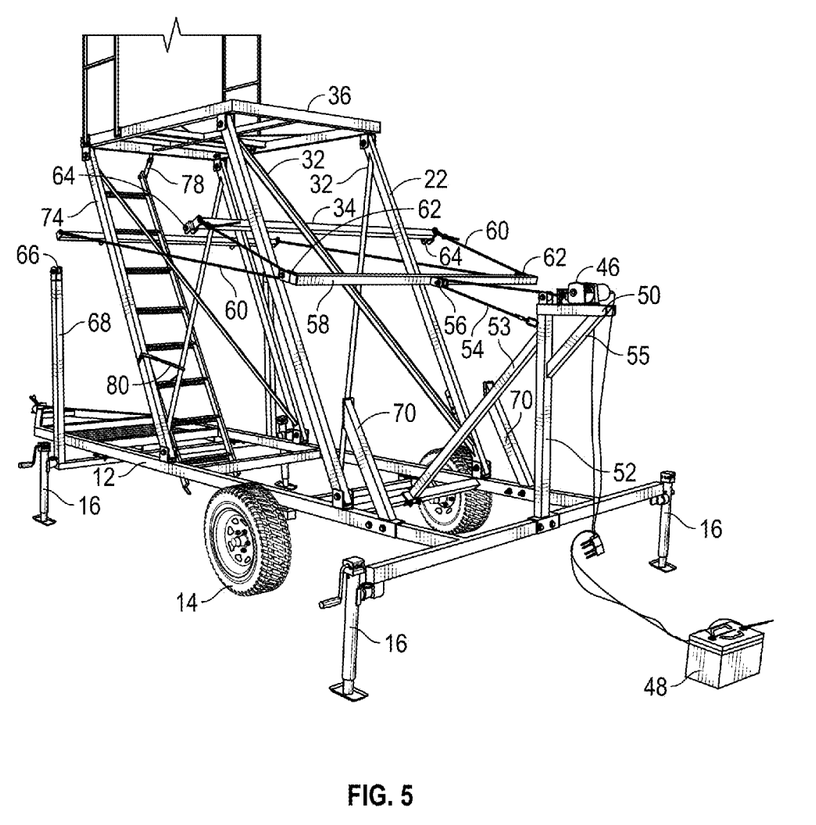
FIG. 5 is another perspective view of the platform in a further raised position, beyond that shown in FIG. 4.

When the platform assembly 10 is in the lowered, transport position (FIG. 3), the cables 60 each extend from one end of the cross bar 32 upwardly over the roller 66 on the post 68, downwardly and under the roller 64 on the cross bar 34, around the pulley 62 on the cross bar 58, to the end of the cross bar 34. When the winch 46 is actuated, the cable 54 begins to wind up on the winch 46, thus pulling on the cross bar 58, which in turn pulls the cables 60 extending around the pulleys 62 rearwardly, thereby beginning to raise the legs 20, 22. The rollers 66 on the upper ends of the post 68 provide leverage for lifting the legs 20, 22 upwardly from the lowered, horizontal transport position. As the cable 54 continues to wind on to the winch 46, the legs 20, 22 continue to rise, as seen in FIGS. 4 and 5. As the cross bars 32, 34 move to an elevation above the top of the posts 68, the cables 60 disengage from the rollers 64 and 66, as seen in FIGS. 5 and 6. As the legs 20, 22 reach the vertical position, the rear legs 22 engage a pair of stop braces 70 toward the rear of the trailer frame 12 such that the legs do not move past a vertical orientation. Each stop brace 70 includes a plate 72 (FIG. 4) to which the rear legs 22 can be bolted to secure the legs in the vertical use position.

The assembly 10 includes a ladder 74 for a person to climb to the platform 36 after the legs are fully raised and bolted or locked to the braces 70. In the preferred embodiment, the upper end of the ladder 74 is pivotally connected to the platform 36 through a pair of link arms 76, 78 (FIGS. 4 and 5). When the legs are in the lowered position, the ladder 74 is folded beneath the platform 36, and strapped, hooked or secured to the platform with at least one strap or tie member 80 (FIG. 4). After the legs 20, 22 are fully raised, the straps 80 can be removed and the ladder 74 folded outwardly and secured to the trailer frame 12 in a convenient manner, as seen in FIG. 6. For example, the lower end of the ladder 74 can be pinned, bolted, or otherwise secured to the trailer frame 12.

To lower the legs 20, 22 and the platform 36 from the upright, use position, the rear legs 22 are unbolted or unlocked from the stop braces 70, and the lower end of the ladder 74 is detached from the trailer frame 12. Then, the winch 46 is actuated in reverse to slowly let out the cable 54, which allows the legs 20, 22 to pivot downwardly. When the cross bars 32, 34 reach the height of the tops of the posts 52, the side cables 60 engage the rollers 66 on the tops of the posts 68, and the rollers 64 on the cross bar 34 for a controlled lowering of the legs 20, 22.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed is:

1. A portable lookout platform assembly movable between a lowered position and a raised position, comprising:
   a trailer frame for towing;
   legs pivotally mounted to the trailer frame;
   a platform pivotally mounted on top of the legs;
   a winch on the trailer frame;
   a first cable having opposite ends attached to the winch and to the trailer frame; and
   a first pulley on the platform in assembly;
   the first cable extending around the first pulley so as to raise and lower the legs when the winch is activated;
   a second cable having opposite ends attached to the legs;
   a second pulley on the platform assembly;
   a first roller on one of the legs;
   a second roller on the trailer frame;
   the second cable extending around the second pulley; and
   the second cable engaging the first and second rollers when the legs are in the lowered position and disengaging the first and second rollers when the legs are in the raised position.

2. The portable lookout platform of claim 1 further comprising a third cable duplicating the second cable, with the second and third cable being on opposite lateral sides of the platform.

3. The portable lookout platform of claim 1 wherein the first cable is at one end of the platform.

4. The portable lookout platform of claim 3 wherein the first cable is centered between opposite sides of the platform assembly.

5. The portable lookout platform of claim 1 further comprising a ladder movable between a non-use position when the legs are moved between the raised and lowered positions and a second position for climbing position when the legs are in the raised position.

6. The portable lookout platform of claim 1 wherein the legs include a set of front legs and a set of rear legs, and the second cable is attached to both the front and rear legs.

7. The portable lookout platform of claim 1 further comprising a cross bar, with the first pulley mounted on the cross bar.

8. The portable lookout platform of claim 7 wherein the cross bar is detached from the legs.

9. The portable lookout platform of claim 1 wherein the trailer frame includes an upright post, and the second roller is on top of the post.

10. The portable lookout platform of claim 1 further comprising a blind mounted on the platform.

11. A lookout stand, comprising:
    a frame;
    a pair of front legs and a pair of back legs, the pairs of legs being interconnected;
    the pairs of legs each having lower ends pivotally attached to the frame;
    a power source mounted on the frame;
    a first cable system including a first cable having opposite ends connected to the power source and to the frame;
    a second cable system including a second cable having opposite ends connected to the front legs and to the back legs; and
    a connector between the first and second cable systems;
    whereby actuation of the power source moves the legs between raised and lowered positions via the cable systems.

12. The portable lookout platform of claim 11 wherein the frame includes wheels for portability.

13. The portable lookout platform of claim 11 the second cable system includes opposite side cables.

14. The portable lookout platform of claim 13 wherein the second cable system includes a pair of cables, rollers and pulleys.

15. The portable lookout platform of claim 11 wherein the power source is a winch.

16. The portable lookout platform of claim 11 wherein the first cable system includes a pulley on the connector and a cable extending around the pulley between the power source and the frame.

17. The portable lookout platform of claim 11 where the second cable system includes a roller on the frame, a roller on one of the legs, a pulley on one of the legs, and a cable extending along the rollers and pulley between the front and back legs.

18. The portable lookout platform of claim 11 wherein the connector is detached from all the legs.

19. The portable lookout platform of claim 11 wherein the pairs of front and back legs move together between the raised and lowered positions.

20. The portable lookout platform of claim 11 further comprising a box on top of the legs, the box being sized to house a standing person.

\* \* \* \* \*